Sept. 6, 1938.  J. H. ESTES  2,128,929
ARTICLE OF MANUFACTURE FROM FIBERS OF BAST OR LEAF ORIGIN
Filed Jan. 6, 1938  2 Sheets-Sheet 1

Inventor
Joseph H. Estes
By Everett E. Kent
Attorney

Sept. 6, 1938.  J. H. ESTES  2,128,929
ARTICLE OF MANUFACTURE FROM FIBERS OF BAST OR LEAF ORIGIN
Filed Jan. 6, 1938  2 Sheets-Sheet 2

Inventor
Joseph H. Estes
By Everett E. Kent
Attorney

Patented Sept. 6, 1938

2,128,929

UNITED STATES PATENT OFFICE 2,128,929

ARTICLE OF MANUFACTURE FROM FIBERS OF BAST OR LEAF ORIGIN

Joseph H. Estes, Boston, Mass., assignor to J. Weston Allen and Everett E. Kent, both of Newton, Mass., and Henry W. Packer, Wellesley, Mass.

Application January 6, 1938, Serial No. 183,606

2 Claims. (Cl. 117—52)

This invention relates to compositions to be used for manufactures from the long fibers of plants.

Numerous varieties of plants have long and strong fibers either in their bast regions, as in the case of ramie, jute, hemp and flax, or in their leaf regions, as in manila, sisal, New Zealand and pita. In the living plant these fibers afford stiffness and strength to the long stem or long leaf, but, after harvesting and suitable weakening of the soft cellular and gummy matter in which these long fibers are embedded, parts of the stem or leaf containing these fibers can be obtained in long coarse filaments separate from the main body of the cortex and woody matter of the stem, or from the skin and pulp of the leaves. The general term "decorticating" is herein used as including any of various bacterial or chemical retting, de-barking, de-gumming and cleaning processes, or mechanical beatings and scrapings, including scutching, hackling and the like, which are employed thus to separate the coarse filaments, and to sub-divide them to the finer filaments known as fibers, and to clear from them unwanted fragments of the plant of a different nature, down to the finest sizes of filament that are obtainable without an eroding of the individual fibers. The product thus obtained, decorticated by any method, and named by the kind of plant from which it came, becomes the "fiber" of commerce and of industry, ready for the manufacturing from it of the products to which it is suited.

Bast and leaf fibers, as heretofore known to commerce and industry, are relatively strong, coarse and stiff. They cannot be made soft and pliable, while retaining strength; and cannot be manufactured into fabrics comparable in fineness or beauty with those made of cotton or silk, or comparable with the products of artificial cellulosic fibers which are made by extrusion. Because of this coarseness and stiffness, bast and leaf fibers can be used only for coarse manufactures, as ropes and other cordage, burlap and mat. Flax is an exception because its fibers are both finer and more weakly cohesive than others, but flax is also a beneficiary of the invention, on its own scale of more diminutive diametric dimensions.

Scientific analyses have shown that such fibers derive their main industrial value from cellulose, but that they also contain other substances. Published analyses, for example, have shown, for jute, a content of cellulose ranging roughly from 50 to 80 per cent. For other fibers the figures more usually are that the cellulosic content is from 65 to 80 per cent of the whole fiber. Excluding moisture, nearly all of the remainder of each decorticated fiber consists of alkali-soluble pectic substances which encase the cellulosic units. The cellulose, or in some cases the ligno-cellulose, which is herein included in the term "cellulosic" because of its having useful properties equivalent to those of cellulose, is in the physical form of tubular cells, called "ultimate cells", microscopic in diameter, but having substantial length. For example, the average diameters of ultimate cells in many kinds of fiber are of the order of .02 millimeter, and in some flax they have been found ultra-microscopic. The length of these cells in sisal, jute and other kinds averages about one-eighth inch; in manila and many others one-quarter inch; and in hemp, flax and still others an inch or longer. These microscopic cells grow joined strongly together endwise in strings which may extend to lengths of several feet, according to the size of the particular plant. Such strings, called fibrils, are cellulosic filamentary structures microscopic in diameter, but possessed of notable strength coupled with pliability and other qualities of industrial value,—except that as the fibrils stand in the fiber, encased in their rough porous stiff envelopes of pectic matter, their pliability and other qualities are largely suppressed and unavailable.

It is not generally practicable to put decorticated fibers to any use in the arts or industry except when considerable numbers of fibers are grouped into small masses, as when twisted into yarns, to be made into cordage or woven into fabric, or when amorphous in larger masses. The composition of which the cordage or woven fabric is then made is that composition which was made by nature,—having only the percentage of cellulose which is in the individual fibers of which the mass is composed, the composition and its products being characterized by coarseness and stiffness.

The present invention provides a composition, for the yarn or other mass, in which the percentage of cellulose is importantly changed; the physical form and content is otherwise reorganized; and properties of the new mass are new for industrial products of bast and leaf fibers, affording numerous and extensive new utilities for products derived from this source. In the new composition the inhibitory restraint imposed by nature on the cellulose is eliminated, and the cellulosic component of the yarn is realistically pliable. Mutual mobility of fibrils is provided, relative to neighboring fibrils, there being open spaces where restrictive tight fitting lamellae were placed by nature; and this contributes another feature to the differentiating of a yarn, or other group unit made of the composition of the invention, from a similar group unit made of the same sort of fibers in their natural state after being fully decorticated. In consequence the yarn mass as a whole has greater tensile strength for its weight or size; greater pliability; can be worked in finer sizes; and can be applied to the making of many articles, not heretofore possible for bast or leaf fibers in general, and not practicable for flax because of the high cost of flax. The invention makes possible the manufacture of threads, and woven, knitted, netted, and knotted fabrics which are comparable in fineness and beauty with similar articles made of cotton, silk or rayon, and which exceed such in their strength. Also there are other advantages, which are new and useful results attained by the invention.

A method by which this radical de-naturing of fiber can be accomplished is disclosed herein being repeated from my copending application for patent Serial 620,054, filed June 29, 1932, of which this present application is a continuation in part.

It has been known that the alkali-soluble pectic substances, encasing the fibrils as lamellae in the fiber, can be removed by immersion in an aqueous alkali solution; but this has been attended by the fatal consequence that the alkali passes immediately through the porous lamellae, attacks the cellulose of the ultimate cells, and by chemical reaction degrades and converts that cellulose to oxycellulose or other weak and brittle substance thus destroying its utility. Acid treatments have been applied, but the pectic cementitious matter which joins the ends of the ultimate cells is acid-soluble; and this weakens the fibrils so that they disintegrate by endwise separation of the ultimate cells.

In the composition of the invention more or less of the cementitious matter which intervened laterally between cells, in the fiber as made by nature, has been removed from the microscopic interstices, to the extent of freeing fibrils from each other; without at the same time weakening the endwise cementitious connections of the cells; and without chemically degrading the tubular walls of the cells; thus leaving the freed fibrils individually intact, strong and free to move relative to each other; and providing in any group mass of the composition a higher percentage of cellulosic matter and a lower percentage of the stiff alkali-soluble crusty matter.

The process by which this result is accomplished is a selective erosion of intercellular matter which by a sort of chemical catamorphism acts throughout a mass, or batch of fibers of convenient size for economical industrial handling, with the result that each "fiber" being a unit which is already fully decorticated, becomes split through the substance therein which does not respond to decorticating treatment. As the action is progressive the fineness of splitting can be controlled, to a degree. If carried to the end it constitutes a sub-dividing of the fibers into individual strings of single connected cells (fibrils),—or even into single long cells in the case of ramie or other plants having cells of comparable extreme length,—wherein the component substance is almost entirely cellulose, ligno-cellulose, or whatever the content is of the strong cells of the fibers. It is convenient to call the process a fibrilizing process, and to call the fiber-bundle fragments "splits".

The particular process thus described involves the excluding of strong alkali from the treatment; the excluding of acid; the making of a colloid which is so perfectly a hydrophilic colloid that it can penetrate fully the microscopic interstices and thus thoroughly can wet the heterogeneous materials that make up the "fiber", and is of such composition that it has adsorptive affinity for, and can serve as a protective colloid for, the cellulosic portion of the fiber; the making of an alkali reactive solution whose essential characteristic is that the alkali is weak, within limits; the supplementing of this, for certain kinds of fibers, with a sodium sulfite characteristic; and the careful control, according to certain principles, of the conditions and duration of application of the solution to the fiber.

The accompanying drawings, which are more or less diagrammatic, illustrate the invention by showing plant and fiber structure in part on the basis of photomicrographic representations in standard treatises, and in Figures 10 and 11 on the basis of a photographic showing of the matters concerned.

Figure 3:
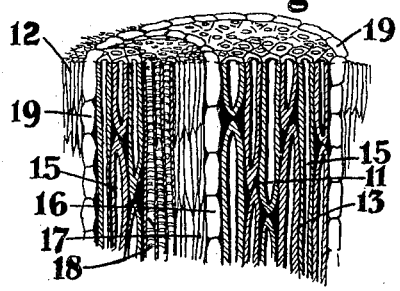
Figures 4, 7, 8, 9:
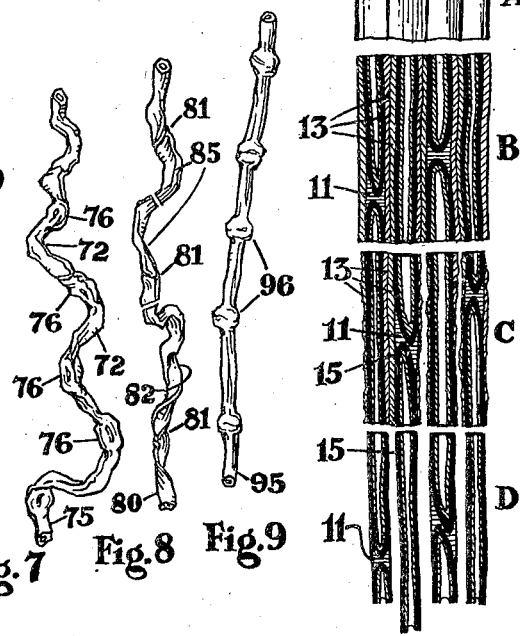

Figure 3 represents in perspective a combined longitudinal and transverse section through such a fiber bundle; and Figure 4 is a schematic drawing on a still larger scale, large enough for details to be shown indicating the three kinds of material between which the selection is made, and representing at A, a fragment of a "fiber", in side elevation, at B a similar fragment in section corresponding to the longitudinal portion of Figure 3; and at C and D the split condition at successive stages of treatment, viz, at C a portion of such a fragment upon which the process of the invention has operated to a certain extent, sufficient to free some of the ultimate cells of their lateral junctures, making separated fibrils; and at D a portion of such a fragment on which the reaction has proceeded further, so that the lustrous cellulose of each ultimate cell is cleaned of all of its lateral surrounding lamellae of cementitious matter, but remains with its own cell walls and its endwise cementitious junctures intact, having fully withstood the chemical attack.

Figure 6:
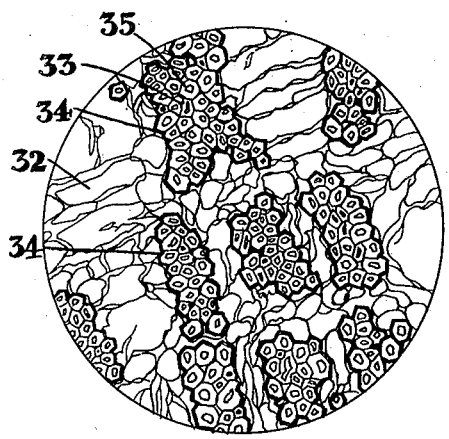
Figure 5:
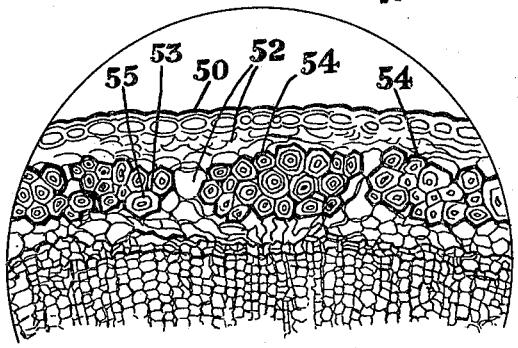
Figure 10:
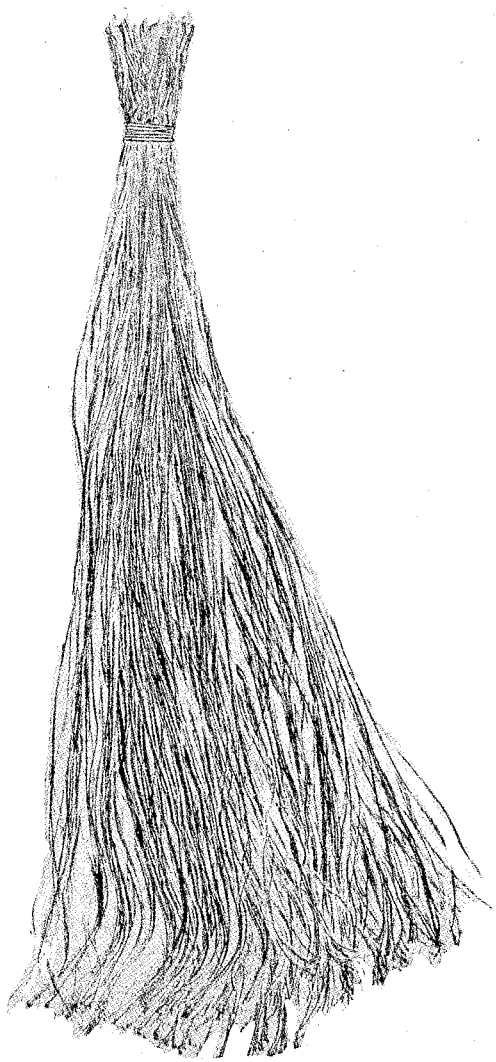
Figure 11:
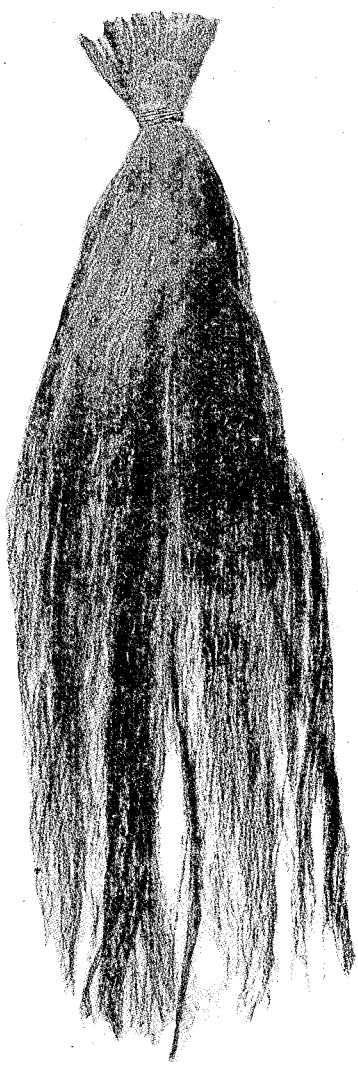

Figure 5 represents a cross section through a fragment of a stalk of flax, greatly enlarged, with introduced heavy outlines indicating fiber bundles such as customarily constitute spinning units or filaments;

Figure 6 represents similarly a fragment of a stalk of jute, in the bast region, showing by introduced heavy outlines the agglomerated bundles of bast fiber, each bundle representing a spinning unit or filament;

Figure 7 represents a fibril of ramie, as it appears when seen microscopically, having knobs between which bends have been made, giving kink to the fibril;

Figure 8 shows similarly a typical development of kink in a fibril not having knobs, as of jute or hemp;

Figure 9 shows similarly a fibril, as of istle, sisal or Sunn hemp, in which knobs existing therein have been made prominent by the treatment;

Figure 10 is a photographic picture of a swatch of ramie decorticated fiber; and Figure 11 is a photographic picture of a specimen composition of the invention, made from decorticated ramie like that shown in Figure 10, the lines and mass body which are black in the drawing being gleaming white in the actual swatch.

Figure 1:
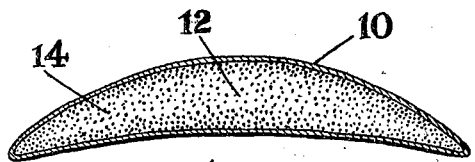
Figure 1 represents a cross section through a leaf of sisal, the dots being fiber bundles.
Figure 2:
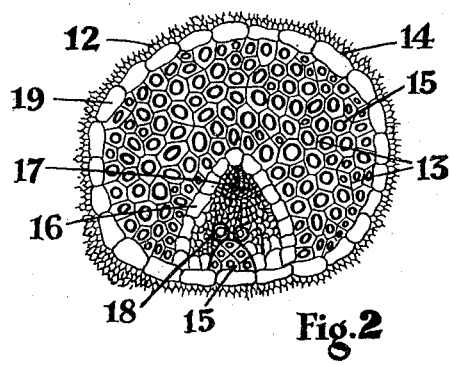
Figure 2 represents a cross section through one of the said fiber bundles, greatly enlarged.

Figure 1 shows a typical fiber-bearing leaf of a kind of plant (in this instance sisal, *Agave sisalana*) whose fiber is strong and long but has hitherto been used mainly for coarse work, as cordage, because it has not been capable of economical sub-division for fine work. The epidermis 10 surrounds a pulpy mass of parenchymatous tissue 12 in which are embedded a multitude of fiber bundles 14. Any one of these bundles 14 is a filamentary unit as now customarily used in industry, called "a fiber" of sisal. But each "fiber" is really a closely agglomerated group of numerous fibrils, as represented in Figure 2. By the process this group can be handled in mass with others as a mass of fibers and each fiber in the mass be individually fractionated into sub-groups of its fibrils, or even into its individual fibrils. These fibrils consist of relatively long tubular cells, Figure 3, the length of cell, in the case of sisal, being one hundred times the cell diameter. But as that proportionately great length really amounts to only 2.5 millimeters (the average for sisal) it is clear that a separation of cell from cell in the individual fibril would not leave a unit of practicable length for spinning into a strong thread. The cells 15 are of cellulose, hard and strong, with walls thickened by interior growth so that they are called sclerenchymatous. Other kinds of long cellulose cells seen in these fibers are the bundle sheaf cells 16, phloem or bast cells 17, and the tracheids or wood cells 18. The envelope of starch cells 19 is of no industrial importance; but the various cells 15, 17, 18 have permanent value. In the plant, and in the fiber bundle after its preparation treatment for spinning, as applied hitherto, they remain still cemented together in their bundle.

Figure 4 illustrates schematically the relative arrangements of adjacent fibrils in leaf fibers, and will serve equally to indicate the same for bast or stalk fibers. However, it should be noticed that, for convenience of illustration, the lateral dimensions are exaggerated, as to thickness of filling between cells; and that the number of cell-ends represented is greater than would ordinarily occur in the length of fiber which is portrayed. Microscopic investigations of structure, aided by differential staining, have shown the cells 15 surrounded by cementitious lamellae whose chemical character varies progressively as one proceeds outward from the pure cellulose of the cell wall, whether proceeding outward laterally of the cell or endwise of the cell. It is the purpose and effect of the process to remove the middle lamella 13 and more or less of its adjacent lamellae also marked 13 which intervene between cells 15, in order to release the cells 15 from their mutual lateral attachment; and yet to avoid removing or substantially weakening those bits 11 of cementitious material which stand between any cells 15 which lie end to end. The latter constitute endwise junctures making a longitudinal succession of cells into a fibril. Both deposits of cementitious matter 11 and 13 usually consist of pectic substances of various kinds, except that in some kinds of plants 13 sometimes has strong ligneous characteristics.

Figure 5, illustrating the bast region of a stalk of flax shows the epidermis 50 of the cortex which surrounds the mass of parenchymatous cells 52 in which are found the bundles 54 of sclerenchymatous cells, which bundles survive the retting process. The heavy lines around the bundle are introduced to indicate the limits of the bundles portrayed, each of which bundles, in ordinary practice, may constitute "a fiber" or filamentary spinning unit of flex or linen.

Figure 6 is similarly a portion of a cross section of the bast region of a stalk of jute, as shown by photomicrograph is a standard treatise, in which the agglomerate character of each spinning "fiber" unit or filament 34 is manifest, consisting of a group of sclerenchymatous cells 35 of bast tissue with intervening parenchymatous cells 32. The coarseness of fabric woven from jute, as burlap, is well known. The invention, by fibrilizing the bundles 34, splitting them into smaller groups or into individual fibrils, makes from jute a spinnable fibrous product from which cloth can be made of very different aspect, because the separate filaments are so soft and flexible.

Fiber bundles of other stalks and leaves, which the process of the invention can likewise split, producing industrially available filaments having the improved qualities herein indicated, are typified by these showings notwithstanding the divergences which exist between kinds of plants, and sometimes between grades of fiber from the same kind of plant. The procedure of the invention is to attack the middle lamella 13, 53 or 33 with a weak alkali capable of moving it by solution and/or chemical attack; while retarding the chemical attack on the cell wall 15 and its more intimate enclosing lamellae which the chemicals used are capable of affecting; and while avoiding the use of chemicals which might attack the materials constituting the endwise juncture 11 between cells. As the effects must be gained by penetration by the protecting material along with the attacking material into spaces of extremely small dimensions, a first requisite is the making of an emulsion whose continuous phase (in this case water) will be perfectly adsorbed on interstitial surfaces and which is so perfect an emulsion that its dispersed phase (in this case a neutral soap) will follow in for giving the desired protection,—in other words an emulsion in which the soap is of essentially colloidal dimension.

For the making of such a hydrophilic colloid I have found it satisfactory to put finely divided well dried neutral soap into water which is boiling. The boiling water has a temperature and a concomitant agitation which will assure the making of a hydrophilic dispersion if the quantity of soap put in be of a proportion ranging between .2 and .5 of one per cent of the quantity of water. With a percentage of soap higher than 1% there is probability of making a hydrophobic mixture or, at any rate, a mixture which does not penetrate among fibrils completely and operate uniformly. With less than the proportion stated, the desired hydrophilic colloidal state may not arise. If the soap be put into cold water which is later heated there is also danger of missing the desired result, because the soap may become hydrolized. But the making of a hydrophilic colloid as stated evidently carries the soap thoroughly into the interstices between fibrils, as openings between them become available during the treatment, and protects the cells from the attack of the alkali of the solution.

For the alkali I prefer to use sodium carbonate in the weak hydrated form called sal soda wherein each molecule is associated with ten molecules of water; and of this crystalline substance I take a quantity in the range between .9 of 1 per cent and 1.3 per cent of the quantity of water into which it is to be put. The equivalent range of anhydrous sodium carbonate would be from a third to a half of one per cent and this is the strength or concentration of alkali in the liquid which that amount of sal soda produces. This, like the soap, is to be ground fine and put into the boiling water.

The degree of alkalinity is controlled by the amount of sodium carbonate added. It is preferred not to use a strongly alkali soap because such soap may contain alkali of a form harmful to the fiber. The character of alkalinity preferred is that of sodium carbonate. Therefore if a soap be used which is near neutral, and a mild alkali, the amount of alkalinity can be controlled, and also the character of the alkalinity.

Preferably the soap and the alkali should be ground and mixed preliminarily, to be put into the water together, for experiment has shown me that the process works less well when the chemicals are not pre-mixed.

The fiber, preferably in quantity weighing about 5 or 10 per cent of the water, may be put into the boiling liquor thus prepared, and the vigorous boiling continued in an open vessel for about a half hour. Boiling in a kier or a closed vessel is to be avoided, as not providing a desired access of atmospheric oxygen. If an oxidizing agent be added in a closed vessel the results are likely to be not uniform.

The fiber is to be removed from the boiling liquid when it can be ascertained, by rubbing a sample between the fingers, that its initial harsh feeling has changed to a slimy, slippery, soft and silky feeling. Over a wide range of fibers I have found that the proper duration of boiling ranges between 25 and 45 minutes; and that the stated half hour is about right for most fibers.

Upon removal from the liquor the fiber is to be rinsed, drained and dried. The rinsing in plain water stops the reaction from continuing.

If treated with acid the product will be weakened, or even broken into short lengths.

Weakening may also result from having alkali too strong in the liquor. And, if treated too long by the specified proper liquor, the fiber will lose in strength, which is due presumably to progress by the alkali in converting cellulose of the cells 15 to oxycellulose which is brittle. This converting reaction is retarded by that quality of the protective colloid which draws it to the surfaces of the cell, and thoroughly wets those surfaces, and absorbs the protective film of neutral soap strongly thereon. Coupled with this are the concomitant weakness of the attack of the alkali on the cellulose, because of the low alkali concentration; and the constant progress meanwhile, during this retardation, of the business or removing the alkali-soluble pectic bodies. As the chemical reaction with, and/or solution of, these pectic bodies progresses, parts of the middle lamellae disappear, and thus the firm lateral junctures between cells diminish. Progressively the ultimate fibrils come to be only weakly connected to each other, a state in which they may later become separated by mechanical rubbing; and progressively entire separations occur as the action of the liquor continues. Separations first occur by breakages through weaker places in the midst of a fiber bundle, leaving the bundle in split fragments. If the treatment be continued long enough, every fibril will come apart from every other. And then, by a further continuance of the treatment, there follow other results to the individual fibrils, as mentioned hereinafter.

The fineness of sub-divisions may be controlled selectively by selecting the time for discontinuing the treatment; stopping it, for instance, a little early, or a little late, to get respectively a coarser or a finer sub-division of fibril bundles, or continuing it still longer to get sub-division into individual fibrils. But in each case the retention by the cells of their native tensile strength, and their endwise connections, leaves them workable as long filaments (fibrils). These retentions of length and strength are important features which distinguish the product.

The explanation underlying this important feature is, I believe, that some among the numerous kinds of pectic bodies, which are present in plant stalk and leaf fibers, are soluble in acid, and some alkali. It is known however that wood fiber can be broken into elements short enough for making paper by either acid alone or by soda alone. Alkali attacks cellulose, converting it to oxycellulose by adding oxygen; and the tubular walls of the ultimate cells 15, 35, 55 consists of cellulose of microscopic thickness. However, it happens that those pectic cementitious bodies which stand laterally between the fiber cells are the ones capable of being taken into solution by the treatment with very weak alkali above described; while those pectic cementitious bodies which connect the ultimate cells endwise resist alkali. They yield to acid. But because caustic alkali is excluded from the formula provided above; and strong concentrations of soda ash are excluded; and also acid is excluded; and the penetrative protective colloid is provided;—under these conditions the composition is capable of completing its work of dissolving the pectic middle lamella before damaging effect upon the cellulose has become appreciable.

Figure 10 shows ramie decorticated fiber before treatment by the above process; and Figure 11 shows the same after being resolved into the composition of the invention; both being as portrayed by photographic camera. The fibers in Figure 10 are in the stage corresponding to A of Figure 4, each filamentary unit in this figure being comparable to one of the groups 54 of Figure 5 or 34 of Figure 3, and containing a percentage of cellulose determined by nature in the growth of the plant. The filamentary units represented in Figure 11 are too fine to be represented in true proportions by black lines on paper, and they are white, instead of the black by which they must be portrayed. Cellulose comprises a proportion of the composition which is thus portrayed, importantly higher than is natural in the ramie decorticated fiber. It is organized in filaments of extremely small diameter. When these are grouped in small masses, as in slivers, or yarns, the group is highly flexible, has tensile strength higher than would be natural for decorticated fiber of the same kind and weight. It constitutes a composition from which articles can be made, after the manner of use of fibers, but possessing many qualities for which bast or leaf fibers that are merely decorticated are not available. This is because of its differences in physical and chemical properties and in physical form, and in attributes, as compared with the properties, form and attributes of the decorticated fiber from which it was made.

For unusual toughness of fiber the concentration of alkali may be increased and used near the higher limits stated, where the fiber is of a kind with which the above treatment is usually satisfactory. These include jute, pita, sisal, ramie, flax, hemp, bear grass, Furcreae macrophylla, Mauritus hemp, Colombian smooth leaved pita, bow string hemp; and for these the above formula of mild carbonate concentration with a protective colloid will satisfactorily suffice.

But in some kinds of plants the cementitious material which stands laterally of the ultimate cells in a fiber bundle has a ligneous component such that it is not sufficiently removed by a weak alkali solution as defined above. These include manila, New Zealand flax, lowest grade sisal (butts and aged stock), cabuya, Colorado River hemp, and other very strong fibers which have never heretofore been made available on a commercial scale for fine spinning so far as I am aware, because of inability to make the sub-division.

For the successful dealing with such it has been discovered that the process operates best when the described liquor is supplemented by addition of a weak concentration of sodium sulfite. It is then effective to remove the ligneous element as desired while still avoiding attack on the cellulose of the cell and on the matter which connects the cells endwise. In such case I modify the proportion of sal soda in the formula given above, so that the total percentage of $Na_2O$ from both the carbonate and the sulfite will be about the same as from the carbonate alone in the formula above given. Otherwise the materials and procedure are similar.

When the crystalline sodium carbonate is used the following proportions serve:

| | Per cent |
|---|---|
| Neutral soap, well dried | .2 to .5 |
| Sal soda | .5 to 1. |
| Sodium sulphite | .2 to .75 |

These are to be preliminarily ground and mixed together and then put into boiling water 100%. In the liquor thus formed the fiber is to be boiled vigorously until a sufficient removal of the lateral cementitious material is discernible by the testing of a sample by feel as above described.

If the formula be carried out by using the sodium carbonate in the form of the monohydrate $Na_2CO_3,H_2O$, its percentage relative to the water would be in the vicinity of .5 to .8% of the water; or, if used in the anhydrous form of soda ash $Na_2CO_3$, the range of about .2 to .7% of the water into which it is put would be equivalent to the preferred formula.

The desirability of excluding caustic alkali having been explained above, in order to avoid having such character or strength of alkali as will appreciably attack the cellulose, it remains to mention two exceptions; first, that such infinitesimal degree (if any) of hydrolysis as occurs incidentally upon the putting of sodium carbonate into aqueous solution has no appreciable effect, and may be treated as a nonentity. Second, a weak concentration of sodium hydroxide may be safely employed to provide the desired alkalinity, if this be in conjunction with the sodium sulfite, because the latter acts as a retarding agent, and in effect renders nugatory the potential attack of the caustic on the cellulose. In that case the sodium hydroxide NaOH may be taken within the range of .1 to .5% and sodium sulfite $Na_2SO_3$ within about the range of .2 to 1.%. Being ground and mixed together and put into 100% of boiling water, a sufficient alkalinity is present for dissolving the lateral pectic bodies, and sulfite for dissolving the ligneous bodies, without affecting the endwise cementitious matter of cells. But the tendency of the sodium hydroxide to degrade the cellulose into oxycellulose is restrained because the sodium sulfite, acting as a reducing agent, seizes upon a large part of whatever oxygen is found in the liquid and so pre-empts it from use in a reaction with the cellulose.

The sodium sulfite has its best effect of separating cells laterally when used in conjunction with weak alkali as herein set forth. Fibers for which it is especially useful are New Zealand flax, manila, cabuya, istle, lowest grade sisal.

The discovery has followed that the known great strength of some of these tropical fibers can be retained in the sub-divided fiber and utilized in cloth and cords of very great strength as compared with the cotton and other fibers which have been the only material hitherto available for the desired small sizes. Applied in the manufacture of automobile tires, the cords may be both smaller and stronger. Applied in cloth the woven fabric may be fine and flexible; but also, because of the nature of certain fibers rendered available by the invention, and hitherto available only in harsh and coarse form, as jute, manila and sisal, cloth may be made from these fibers which process to be surpassingly soft and silky. Such cloth may be close woven, and even be tight against passage of air or water; greatly surpassing cotton and linen in strength, and yet being less than cotton in cost.

An important matter from the industrial standpoint is the getting of uniformity of product, as regards degree of sub-division. A feature of the process which contributes to this is the perfection of the hydrophilic colloid, and this is promoted both by observance of the stated limits and the maintenance of a boiling condition of the water when the mixture is introduced. Another contributing feature is the maintaining of a condition of vigorous ebullition during the treatment. This tends to equality of application of the process to all parts of the fiber.

The treatment may be stopped when the described stage has been reached as between some but not all of the fibrils of a bundle. The fiber bundle will then be fractioned into smaller groups of fibrils; and for some industrial uses this will be sufficient and be even better than the extreme sub-division which is obtainable by continuing the treatment till all individual fibrils are separated.

The preliminary decorticating steps merely segregate the fibers (bundles 14, 34, 54) from unwanted matter. Such partial success as may have been attained in splitting bundles, whether by long continued bio-chemical decay in the retting, or by treatment in boiling solutions of alkali and/or acid, or by maceration, has been always, I believe, accompanied by injury to and deterioration of the fibrous product, and has resulted in the weakening of the cellulose cells, or their endwise junctions.

The fibrilized product of the present invention is distinguished from all such by its cells being of their original strong quality of cellulose, their endwise junctures unaffected, and their physical structure unimpaired by crushing, maceration or breakage.

The surfaces of cleavage left on the elements separated by the invention will be, in some cases, the pure cellulose surfaces of the individual cells in the fibrils, as in Figure 4—D. If the eroding treatment be carried less far, the cell surfaces may retain some of their surrounding cementitious lamellae, as indicated by the rough lines in Figure 4—C, or indeed the process may have been stopped when the original bundle, splitting first at its thinner or weaker places, had as yet separated only into group fragments, each containing several fibrils. In either event the product is spinnable into finer threads than while the original bundles remained undivided. And in either case the distinction is noted, over such fibers as flax, for example, where reduction of the retted product is executed by various methods of bruising and fracture, that the unitary filament produced by the present invention has its cells and connections substantially whole in longitudinal extent, with separation and surfaces made gently by restricted erosion, and that the mass contents are homogeneous in form.

The relative lateral thickness of cementitious matter is greatly exaggerated, in the drawings; and it is to be expected that in ordinary commercial practice substantially the whole of this really very thin substance will usually be removed from the outside of the filamentary units produced by the fibrilizing treatment. Microscopic diametric measurements of fibrils freed by the process of the invention, in certain experiments made under my direction over a wide range of kinds of fibers, have shown figures markedly less than the figures (measured from middle lamella to middle lamella as they lay in the retted fiber) published by previous investigators as diameters of the same kinds of fibers. This indicates that, in the fibrilized product, cementitious matter which was surrounding the cell laterally has been removed.

Comparison for loss of weights indicates the same. In an illustrative instance, the product, being splits as indicated at Figure 4—D, was found to have the same composition chemically as the fiber had before treatment, except that the greater part of the pectic substances were absent; and the fats, waxes and gums were also absent. Before treatment the analysis showed:

| | Per cent |
|---|---|
| Cellulose | 76.1 |
| Pectic bodies | 11.3 |
| Ligneous matter | 1.4 |
| Fats, waxes, gums | 5.4 |
| Moisture | 5.8 |

The pectic substances are known by differential staining to be located mostly within the fiber-bundle and between the fibrils, where they constitute the lamellae of cementitious matter; and the fats, waxes and gums are mostly or wholly outside of the fiber-bundle. As left by the retting or decorticating process the fiber of a plant is frequently in units too stiff and coarse to be handled well for spinning, because the fiber units are agglomerations of bundles held together by the gums and waxes. Therefore "degumming" processes of various sorts are used to break these down into fiber-bundles. Such processes, and also processes proposed for breaking a fiber bundle down into its ultimate fibers, if using acid or strong alkali will weaken or injure the cellulose, or the endwise junctures of cells.

The pectic bodies in the removed lamellae have relatively little strength compared with the cellulose of the sclerenchymatous cells. They are porous; and thus the eager wetting powers of the soap dispersion are believed to have quick access to the cellulose walls for their protective adsorption thereon. But if the agitative boiling be continued too long the progress of the alkali in degrading the cellulose is observable, with a marked reduction of strength of the cells and the resulting product.

However the boiling treatment may with advantage be continued beyond the stage of erosion of lamellae and separation into individual ultimate fibrils. An extra ten minutes results in the introduction of a new characteristic into the fiber, viz kinks, represented in Figures 7, 8 and 9, which are comparable in effect to the kink of wool, making the fiber, when spun, hold together better than heretofore, and so be easily spinnable into finer counts of thread. In the case of ramie, Figure 7, this contrasts with ordinary ramie fibers, which without this treatment are characteristically straight and smooth, and difficult for textile use. And from this there results cloth which in some respects closely resembles woolens, having qualities of kink, warmth, and great strength, but being also insect proof and more absorbent of moisture than is wool; and this cloth may be of very light weight. The kinked ramie fiber or threads can be used either alone or intermingled with woolen.

In a ramie cell 75 there are knobs 76 at intervals; and the kinks 72 arise from bends which develop in the shaft of the cell between the knobs. In jute and hemp, (Figure 8) where no knobs are observed in the fibril 80 (made up of cells 85 joined at 81) sinuous forms 82 arise. In the case of these particular fibers, as the length of a cell 85 is of the order of a hundred or a thousand times its thickness, breaks are made in the drawings so that successive fiber junctures 81 can come into the picture with their cementitious material intact. In some other fibers, Figure 9, it appears that knobs are present morphologically in the cell 95, and that they are developed as at 96 by the erosion of the cementitious lamellae surrounding them, corresponding to 13 of Figure 4, instances being seen in istle, sisal and Sunn hemp. These effects tend to make the respective fibers more spinnable.

Figures 7, 8 and 9, as also Figure 4, have been drawn after careful observation of the working of the invention, and microscopic study, and represent the subject matter as the structure is believed to be.

I do not know the explanation for the development of this kink, but I suggest the following as being probable: The cellulose wall of the fibril cell is uneven as regards thickness, and, when the surrounding cementitious material has been removed by the treatment, water of the solution acquires access to the cellulose wall, which, being a colloid, swells under the access of water and, being uneven in thickness, swells unevenly, which produces contortions. The presence of this kink, however brought about, and the development of protuberances, indicated in Figure 9, which are comparable in industrial results, and may for practical purposes herein be included under the general term of kink, is an extremely important element of industrial utility in that it enables these various kinds of fibers, hitherto relatively smooth, to become strongly inter-engaged when reduced to fibrils and spun, thus making strong threads, even though the count be very fine.

By removing pectins and the pectic lamellae which surround the ultimate cells, the process of the invention incidentally removes whatever is adhering to those lamellae, and this includes the fats, waxes and gums, and any bits of bark, dirt, or oil, on the outside of the fiber-bundle. In so doing it removes matters which attract insects because of their food value or furnish basis for obnoxious small plant growth, as molds and mildews. The absence of food values in the fiber makes the products manufactured from the treated fiber, as clothing, be therefore insect, mold and mildew proof, unless some other insect or plant foot be added during later steps of manufacture.

Another effect of removing the lamellae while preserving the endwise junctures of ultimate cells is that it uncovers the color and lustre of the pure cellulose of the walls of the latter. And this, because of the freedom from deteriorative matter above stated, appears to be capable of very permanent continuance. In particular it is not destroyed by laundering, as are "mercerized" effects. But this lustre is not obtained from such parts of the cellulose as remain covered; nor from such parts as become degraded into oxycellulose, by reaction with alkali; or into hydrocellulose if there were ammonia present; or become pitted by erosion of the natural cellulose surface under the alkali attack, which is at work close by in its task of dissolving the pectic bodies. For the successful avoidance of such ill effects in the cellulose, the above described colloidal hydrophilic dispersion of neutral soap is important, for close adsorption selectively by the cellulose, as is also a proper concentration of the alkali at a degree where it will erode the pectic cementitious matter and yet not be strong enough either to coagulate or disrupt the protective film of soap (within the time necessary for the desired operation) or so as to get at the cellulose and attack it effectively (within the time needed for practicable operation). Two of the fibers named have a slightly different material in the walls of their ultimate cells, viz, jute, which has ligno-cellulose and flax, which has pecto-cellulose, but as all or practically all of the others have cellulose, and as the behavior of the cellulose and the pecto-cellulose and the ligno-cellulose is substantially the same, in the matters with which this specification deals, the term "cellulose" is used in the claims to refer to them indiscriminately.

Another effect of converting the fiber to fibrillized form with the cellulose surface of the cell walls exposed is that the remarkable absorptive power of pure cellulose surface for water and aqueous liquids, as human blood, becomes available; and it is observed that the fibrillized product of various plant fibers as jute or ramie, masses of which never heretofore have been considered absorbent, are found to be very absorbent, more so, for example, than standard "absorbent cotton".

Another observed characteristic of the fibrillized product is the homogeneity of a mass of the fibers which have been treated together, in the sense that the splits of the fiber-bundles display a marked uniformity of diametric size and of surface and chemical characteristics,—to an extent which renders them distinctive in this respect among bast and leaf fibers known to commerce and industry.

The product of the described treatment is likely to be in most cases merely a step-product, to be followed by other steps of manufacture, as dyeing, spinning, weaving; yet in some cases, as where intended for use as an absorbent, the product of the treatment may be the final form in which the fiber is to be used. Therefore, in the claims the general term "product" is used to refer equally to a mere step-product, or indeed it may be, a piece of woven cloth, for the described treatment for fibrillizing the fibers is applicable whether before or after spinning and weaving.

The preliminary decortication need not be complete; and in the case of manila, for example, where the decortication is so imperfect that the fiber is rated only as of low grade, the described treatment nevertheless produces satisfactory fibrillizing results.

The requirement of the process for neutral soap is served by the so-called "neutral soap" of commerce, which sometimes is very slightly alkaline.

The process operates best, in my observation, under a boiling condition of the liquid in the open air; but this situation can be approximated at a temperature somewhat less than boiling in which a strong and universal circulation of the liquid among the fibers is promoted by other means.

The resulting filamentary fragments of fiber-bundles are conveniently said to be "chemically split" because the division occurs on the longitudinal lines, and these filamentary fragments themselves are referred to as "splits" notwithstanding that the division occurs by removal of material leaving a surface of erosion, as distinguished from the more ordinary sense of the word "split" which signifies a longitudinal fracture made by mechanical force of spreading and rending, leaving a surface of fracture.

And the term "catamorphosis" is used, by analogy from terminology employed in geology, to signify the breaking down of the form of the fiber by its splitting into fragments,—by erosion of lateral bonds between cells.

Statements of quantity refer to weights, unless otherwise expressed.

The composition of the invention may be made from fiber which has already been woven into cloth; for example, a sheet of ordinary burlap, a stiff fabric woven from jute, is made flexible, soft and absorbent by receiving the above described treatment.

Among the fields in which the invention has already been found useful are:

Compositions available for fine spinning, derived from certain kinds of fibers, for which only coarse spinning has heretofore been practicable, illustrative instances being found in pita, sisal, manila, New Zealand, and many other fibers which are scientifically known to have valuable qualities but which have not been utilized because of difficulty in spinning. The term "pita" used in this connection refers not only to the forty or so botanical varieties in whose name the word pita occurs, but also specifically to the variety having no botanical name, so far as I know, which is found in the Magdalena Valley in Colombia and has a very long, strong and fine fiber hitherto practically unmanageable.

Compositions in fine filamentary form derived from fibers without disproportionate reduction of strength, illustrations being found in hemp, jute, flax, pita, sisal, ramie.

Compositions having a pronounced absorbent quality, of the order of absorbent cotton, derived from inexpensive fibers hitherto having no such quality; having also an observable increase of elasticity of the spun or woven product; devoid of characteristic individual odor such as heretofore has persisted offensively in the unfibrillized fiber, and been subject to regeneration by moist air as in hemp, jute and flax; displaying a beautiful native lustre of the fiber, in some instances not realized heretofore.

Compositions which will retain permanently the whiteness produced by bleaching; compositions which can be manufactured without the customary washing and scouring before the usual bleaching, with saving of costs; and compositions whose woven product is free from shrinkage, obviating the usual cloth pre-shrinking operation.

As the fiber masses with which the invention is concerned come only by the mass being freed of matter standing laterally between the cellulosic cells, the invention is independent of the various lengths of fibrillous elements into which those cells may happen to be joined endwise, whether in the various lengths as grown by nature or in the various lengths of staple to which the fiber is cut for manufacture in the thread masses or otherwise.

I claim as my invention:

1. A new article of manufacture, being a multifibrillous twisted thread whose fibrils have characteristics of shape identifying them as having originated in long and strong bast or leaf fibers of plants, said fibrils comprising ultimate cells of such fibers with the natural endwise joinders of such cells remaining as in the natural fiber, but the cells being predominantly devoid of the natural lateral-joining substances which exist in decorticated fiber; and also differing from a thread of natural fiber, of like kind decorticated, in that the thread is homogeneous in aspect and in feel, and is highly flexible; and also differing in that the mass of the thread contains a substantially larger concentration of cellulose, in that natural state in which that cellulose occurs in the natural bast or leaf decorticated fiber, than does a thread of that kind of decorticated natural fiber with whose fibrils the said fibrils of the product are identifiable.

2. A new article of manufacture, being a multifibrillous mass wherein the fibrils are mutually separate from and independent of each other, but possess physical and chemical characteristics identifying them as having originated in long and strong bast or leaf fibers of plants; said fibrils comprising ultimate cells of such fibers with the natural endwise joinders of such cells remaining as in the natural fiber; but the mass being practically free from non-cellulosic associated matter which naturally occurs associated with said cells, except that the said endwise joinders and ligneous matter and moisture remain; and differing from a mass of natural fiber of the like kind, decorticated, in that portions of the mass having fibrils laid in the same direction are highly flexible, and also differing in that cellulose, in that natural state in which cellulose occurs in the natural bast or leaf decorticated fiber, is concentrated in the mass as a substantially larger proportion of the whole mass than such cellulose constitutes in that kind of decorticated natural fiber with whose fibrils the said fibrils of the product are identifiable.

JOSEPH H. ESTES.